(12) United States Patent
Jovicic et al.

(10) Patent No.: US 9,813,676 B2
(45) Date of Patent: Nov. 7, 2017

(54) USE OF MOBILE DEVICE WITH IMAGE SENSOR TO RETRIEVE INFORMATION ASSOCIATED WITH LIGHT FIXTURE

(71) Applicant: QUALCOMM Incorporated, San Diego, CA (US)

(72) Inventors: Aleksandar Jovicic, Jersey City, NJ (US); Kumar Appaiah, Piscataway, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 371 days.

(21) Appl. No.: 14/103,832

(22) Filed: Dec. 11, 2013

(65) Prior Publication Data

US 2015/0163459 A1 Jun. 11, 2015

(51) Int. Cl.
*H04N 5/28* (2006.01)
*H04N 7/18* (2006.01)
*G06K 9/46* (2006.01)
*G06T 7/00* (2017.01)
(Continued)

(52) U.S. Cl.
CPC ............ *H04N 7/183* (2013.01); *G01S 1/70* (2013.01); *G06K 9/4661* (2013.01); *G06T 7/00* (2013.01); *H04N 5/28* (2013.01); *G01S 5/16* (2013.01)

(58) Field of Classification Search
CPC ........ H04N 7/181; H04N 7/183; H04N 7/186; H04N 7/18; H04N 7/188; G08B 13/19656
See application file for complete search history.

(56) References Cited

U.S. PATENT DOCUMENTS

| | | | |
|---|---|---|---|
| 8,441,534 B2* | 5/2013 | Hubmer | G08B 13/2402 348/143 |
| 8,912,905 B2* | 12/2014 | Wong | F21S 4/008 340/572.4 |
| 9,173,188 B2* | 10/2015 | Miyawaki | H04W 64/00 |

(Continued)

FOREIGN PATENT DOCUMENTS

| | | |
|---|---|---|
| CN | 1299083 A | 6/2001 |
| CN | 1299083 A | 6/2001 |

(Continued)

OTHER PUBLICATIONS

ISA/EPO, International Search Report and Written Opinion of the International Searching Authority, Int'l. App. No. PCT/US2014/067949, dated Mar. 13, 2015, European Patent Office, Rijswijk, NL, 13 pgs.

IPEA/EPO, Second Written Opinion of the International Preliminary Examining Authority, Int'l. App. No. PCT/US2014/067949, dated Nov. 3, 2015, European Patent Office, Munich, DE, 4 pgs.

*Primary Examiner* — Frank Huang
(74) *Attorney, Agent, or Firm* — Holland & Hart LLP

(57) ABSTRACT

Methods, apparatus, systems, and devices are described for using a mobile device equipped with an image sensor to retrieve information associated with a light fixture. A method of using a mobile device equipped with an image sensor to retrieve information associated with a light fixture may include capturing, at the image sensor, an image of an illuminated indicia. The illuminated indicia may be co-located with the light fixture. At least one characteristic of the illuminated indicia may be determined from the image of the illuminated indicia. Information associated with the at least one characteristic of the illuminated indicia may be retrieved.

28 Claims, 11 Drawing Sheets

(51) Int. Cl.
*G01S 1/70* (2006.01)
*G01S 5/16* (2006.01)

(56) References Cited

U.S. PATENT DOCUMENTS

| | | | |
|---|---|---|---|
| 2008/0278324 A1* | 11/2008 | Uchimura | G01S 1/70 340/572.1 |
| 2010/0225484 A1* | 9/2010 | Van De Sluis | G01S 5/16 340/572.4 |
| 2011/0057581 A1 | 3/2011 | Ashar et al. | |
| 2012/0241043 A1* | 9/2012 | Perazzo | A61J 7/0053 141/2 |
| 2013/0026224 A1 | 1/2013 | Ganick et al. | |
| 2014/0084050 A1* | 3/2014 | Calvarese | G01S 5/163 235/375 |
| 2014/0232866 A1* | 8/2014 | Lee | G01S 5/16 348/143 |

FOREIGN PATENT DOCUMENTS

| | | |
|---|---|---|
| CN | 1968873 A | 5/2007 |
| CN | 1968873 A | 5/2007 |
| CN | 101180563 A | 5/2008 |
| CN | 101180563 A | 5/2008 |
| CN | 101688912 A | 3/2010 |
| CN | 101688912 A | 3/2010 |
| EP | 1760013 A1 | 3/2007 |
| WO | WO-2008152545 A1 | 12/2008 |
| WO | WO-2013028359 A1 | 2/2013 |
| WO | WO-2013051905 A2 | 4/2013 |
| WO | WO-2013126585 A1 | 8/2013 |
| WO | 2013158955 A1 | 10/2013 |
| WO | WO-2013158955 A1 | 10/2013 |

\* cited by examiner

USE OF MOBILE DEVICE WITH IMAGE SENSOR TO RETRIEVE INFORMATION ASSOCIATED WITH LIGHT FIXTURE

BACKGROUND

The following relates generally to techniques for detecting information about a light fixture in an indoor environment. A mobile device may use the detected information about the light fixture to estimate the position of the mobile device. Accurate estimation of the position of a mobile device in an indoor environment can be useful in a number of applications, such as navigating mobile phone users in office/commercial environments, enabling customers to find items in a supermarket or retail outlet, coupon issuance and redemption, customer service and accountability, etc.

Achieving precise position estimates can be a challenging task. Indoor positioning is typically achieved using radio frequency (RF) signals received from Wi-Fi access points (or similar means). However, this technique requires mobile devices to learn RF signal propagation parameters, which presents a significant technical challenge for achieving high precision (<1 meter) position accuracy.

SUMMARY

The described features generally relate to one or more improved methods, apparatuses, systems, and/or devices for receiving light from a light fixture and retrieving information associated with the light fixture. More particularly, an image sensor (e.g., a camera) of a mobile device may be used to receive light from one or more light fixtures. If an indicia capable of being illuminated by a light fixture is placed in, on, or adjacent to the light fixture, the light received from the light fixture at the image sensor may at least partly define an image of the illuminated indicia. The mobile device may use the image of the illuminated indicia to determine at least one characteristic of the illuminated indicia. Information associated with the at least one characteristic of the illuminated indicia may then be retrieved. If the illuminated indicia is unique to a particular light fixture, the retrieved information may include a unique location of the light fixture. The mobile device may use the location of the light fixture, and possibly other information, to determine location-based information for the mobile device (e.g., a position, direction, orientation, and/or distance of the mobile device with reference to the light fixture (or with reference to a plurality of light fixtures)).

In a first set of illustrative embodiments, a method of using a mobile device equipped with an image sensor to retrieve information associated with a light fixture is described. In one configuration, the method may include capturing, at the image sensor, an image of illuminated indicia; determining, from the image of the illuminated indicia, at least one characteristic of the illuminated indicia; and retrieving information associated with the at least one characteristic of the illuminated indicia. The illuminated indicia may be co-located with the light fixture.

In some examples of the method, the retrieved information may include a location of the light fixture. In some cases, the location of the light fixture may be the location of the light fixture with respect to a floor map. When the retrieved information includes the location of the light fixture, the method may further include determining location-based information for the mobile device using at least the location of the light fixture.

In some examples of the method, the at least one characteristic of the illuminated indicia may include at least one color, or a position of at least one colored region within the illuminated indicia, or at least one pattern, or at least one shape. In examples where the at least one characteristic of the illuminated indicia includes at least one pattern, the at least one pattern may include a pattern having regions of different color.

In some examples, the method may include identifying an illuminated region of the image sensor having a brightness exceeding a threshold, and determining a position of the image of the illuminated indicia with respect to the illuminated region of the image sensor. The illuminated region may at least partly define the image of the illuminated indicia, and the at least one characteristic of the illuminated indicia may include the position of the image of the illuminated indicia with respect to the illuminated region of the image sensor. In some cases, identifying the illuminated region of the image sensor may include identifying a set of pixels having a brightness exceeding the threshold. In some cases, identifying the illuminated region of the image sensor may include identifying at least one corner of the illuminated region of the image sensor, and determining the position of the image of the illuminated indicia with respect to the illuminated region of the image sensor may include determining the position of the image of the illuminated indicia with respect to the at least one corner of the illuminated region of the image sensor. In some cases, the at least one characteristic of the illuminated indicia may further include a pattern including regions of different color.

In some examples of the method, the retrieved information may include at least one of text, audio, or video information for viewing or playback via the mobile device.

In a second set of illustrative embodiments, a mobile device equipped with an image sensor to retrieve information associated with a light fixture is described. In one configuration, the mobile device may include means for capturing, at the image sensor, an image of an illuminated indicia; means for determining, from the image of the illuminated indicia, at least one characteristic of the illuminated indicia; and means for retrieving information associated with the at least one characteristic of the illuminated indicia. The illuminated indicia may be co-located with the light fixture. In certain examples, the mobile device may further include means for implementing one or more aspects of the method for wireless communication described above with respect to the first set of illustrative embodiments.

In a third set of illustrative embodiments, another mobile device equipped with an image sensor to retrieve information associated with a light fixture is described. In one configuration, the mobile device may include a processor, memory in electronic communication with the processor, and instructions stored in the memory. The instructions may be executable by the processor to capture, at the image sensor, an image of an illuminated indicia; determine, from the image of the illuminated indicia, at least one characteristic of the illuminated indicia; and retrieve information associated with the at least one characteristic of the illuminated indicia. The illuminated indicia may be co-located with the light fixture. In certain examples, the instructions may be further executable by the processor to implement one or more aspects of the method for wireless communication described above with respect to the first set of illustrative embodiments.

In a fourth set of illustrative embodiments, a computer program product for retrieving information associated with a light fixture is described. The computer program product may include a non-transitory computer-readable medium storing instructions executable by a processor. The instructions may be executable by the processor to capture, at an image sensor, an image of an illuminated indicia; determine, from the image of the illuminated indicia, at least one characteristic of the illuminated indicia; and retrieve information associated with the at least one characteristic of the illuminated indicia. The illuminated indicia may be co-located with the light fixture. In certain examples, the instructions may be further executable by the processor to implement one or more aspects of the method for wireless communication described above with respect to the first set of illustrative embodiments.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The retrieval of information associated with a light fixture may be facilitated by placing indicia capable of being illuminated in, on, or adjacent to the light fixture. If the indicia is unique, an image of the indicia captured at an image sensor of a mobile device may be used to retrieve a unique location of the light fixture. In some cases, an illuminated indicia may include a sticker having an array of illuminable colored regions. The sticker may in some cases be easily placed on or adjacent a light fixture, making it quicker and/or less costly to identify the light fixture (e.g., as opposed to replacing a cheaper and/or existing light fixture with a visible light communications (VLC) light fixture).

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
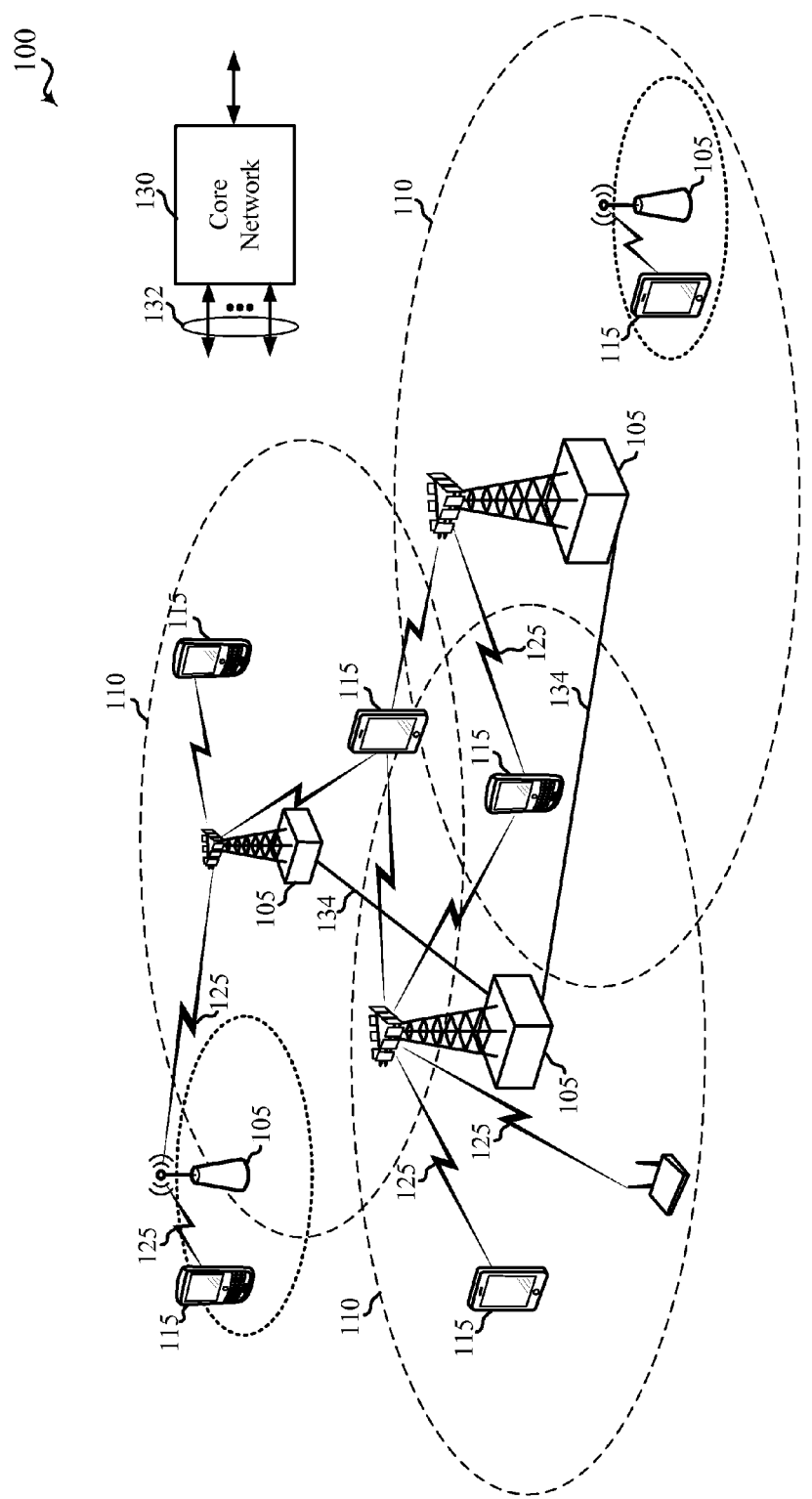
FIG. 1 is a diagram illustrating an example of a wireless communications system.

Referring first to FIG. 1, a diagram illustrates an example of a wireless communications system 100. The system 100 includes a plurality of access points (e.g., base stations, eNBs, or WLAN access points) 105, a number of mobile devices 115, and a core network 130. Some of the access points 105 may communicate with the mobile devices 115 under the control of a base station controller (not shown), which may be part of the core network 130 or certain access points 105 (e.g., base stations or eNBs) in various embodiments. Some of the access points 105 may communicate control information and/or user data with the core network 130 through backhaul 132. In some embodiments, some of the access points 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The access points 105 may wirelessly communicate with the mobile devices 115 via one or more access point antennas. Each of the access points 105 may provide communication coverage for a respective coverage area 110. In some embodiments, an access point 105 may be referred to as a base station, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, or some other suitable terminology. The coverage area 110 for an access point may be divided into sectors making up only a portion of the coverage area (not shown). The system 100 may include access points 105 of different types (e.g., macro, micro, and/or pico base stations). The access points 105 may also utilize different radio technologies. The access points 105 may be associated with the same or different access networks. The coverage areas of different access points 105, including the coverage areas of the same or different types of access points 105, utilizing the same or different radio technologies, and/or belonging to the same or different access networks, may overlap.

In some embodiments, the system 100 may include an LTE/LTE-A communications system (or network). In LTE/LTE-A communications systems, the term evolved Node B (eNB) may be generally used to describe one of the access points 105 and the term user equipment (UE) may be generally used to describe one of the mobile devices 115. The system 100 may also be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The mobile devices 115 described herein may be used in either synchronous or asynchronous operations.

The UEs 115 may be dispersed throughout the wireless communications system 100, and each UE 115 may be stationary or mobile. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE may be able to communicate with macro eNBs, pico eNBs, femto eNBs, relays, and the like. A UE may also be able to communicate over different access networks, such as cellular or other WWAN access networks, or WLAN access networks.

The communication links 125 shown in system 100 may include uplinks for carrying uplink (UL) transmissions (e.g., from a UE 115 to an eNB 105) and/or downlinks for carrying downlink (DL) transmissions (e.g., from an eNB 105 to a UE 115). The UL transmissions may also be called reverse link transmissions, while the DL transmissions may also be called forward link transmissions.

In some cases, a mobile device 115 may include an image sensor capable of capturing an image. When a mobile device 115 captures an image in an indoor environment, the image may include a number of illuminated regions corresponding to a number of light fixtures that illuminate the image sensor.

Figure 2:
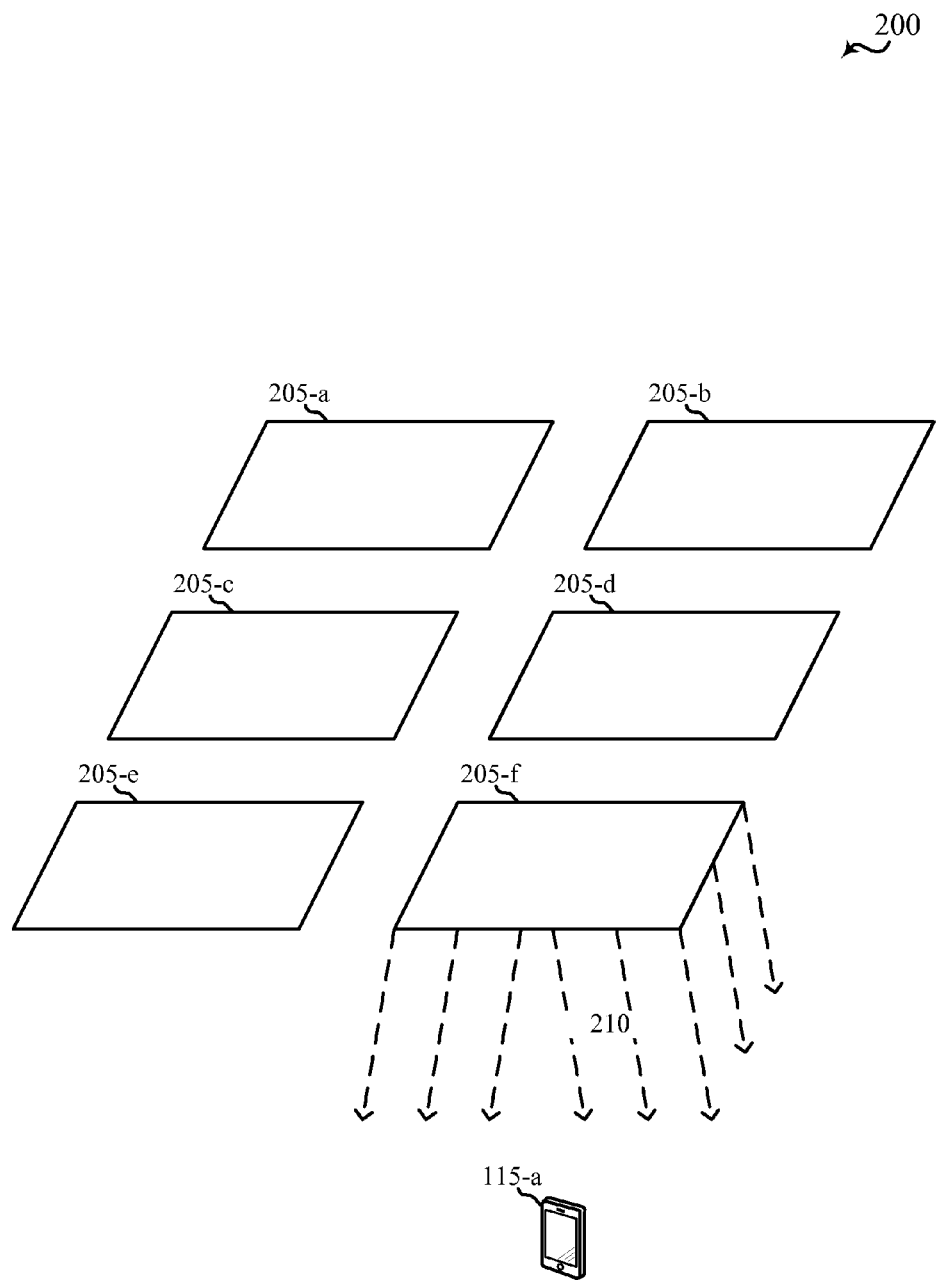
FIG. 2 is a diagram illustrating an example of a mobile device positioned below a number of light fixtures.

FIG. 2 is a diagram 200 illustrating an example of a mobile device 115-a positioned below a number of light fixtures 205-a, 205-b, 205-c, 205-d, 205-e, and 205-f. The mobile device 115-a may be an example of one or more aspects of the mobile devices 115 described with reference to FIG. 1. In some cases, a subset of the light fixtures (e.g., only a particular one or more of the light fixtures) may illuminate the mobile device 115-a. For example, in FIG. 2, the mobile device 115-a only receives illumination 210 from the light fixture 205-f. As the mobile device 115-a is moved from one position to another position below the light fixtures 205-a, 205-b, 205-c, 205-d, 205-e, and 205-f, different subsets of the light fixtures may illuminate the image sensor of the mobile device 115-a.

Figure 3:
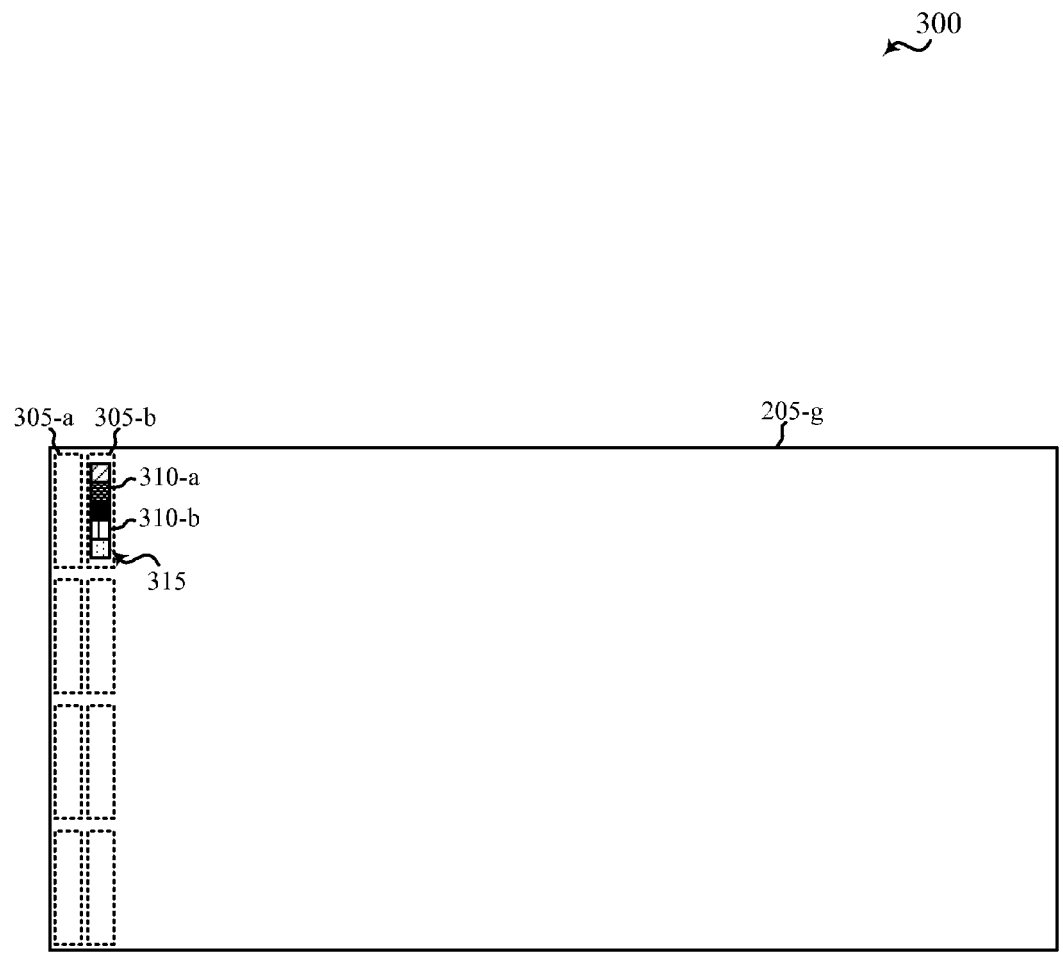
FIG. 3 is a plan view of a light fixture having an illuminated indicia, in accordance with various embodiments.

FIG. 3 is a plan view 300 of a light fixture 205-g having an illuminated indicia 315, in accordance with various embodiments. The illuminated indicia 315 may be unique to the light fixture 205-g, thereby enabling a mobile device such as one of the mobile devices described with reference to FIGS. 1 and/or 2 to uniquely identify the light fixture 205-g. As shown, the illuminated indicia 315 may include a pattern, where the pattern includes N regions of different color (e.g., five regions (N=5) including regions 310-a and 310-b). In some embodiments, each region may assume one of K possible colors. Also, and in some cases, the pattern of colored regions may be placed in one of P possible positions (e.g., one of P possible positions including positions 305-a and 305-b).

Given a pattern of N elements positioned at one of P positions, with each of the N elements being capable of assuming one of K possible colors, $P*K^N$ unique identifiers are possible. Thus, for N=5, K=10, and P=8, 800,000 unique identifiers are possible (equivalent to a 20-bit identifier). Tradeoffs between the number of unique identifiers, the robustness of an algorithm used to process an image of the illuminated indicia (e.g., at a mobile device 115), and the impact on a light fixture's aesthetics may be made in selecting the numbers N, K, and P. In some embodiments, the illuminated indicia 315 may be provided on a 4 foot by 8 foot overhead light fixture using one centimeter by one centimeter colored regions.

Figure 4:
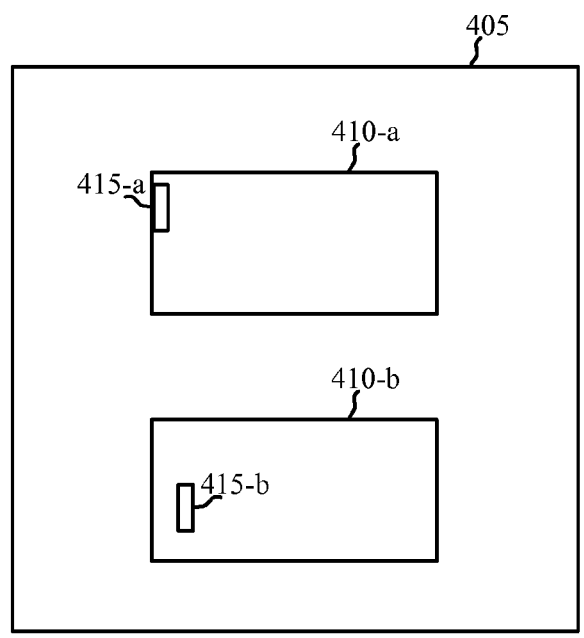
FIG. 4 is a plan view of an image sensor illuminated by a number of light fixtures, in accordance with various embodiments.

FIG. 4 is a plan view of an image sensor 405 illuminated by a number of light fixtures, in accordance with various embodiments. The image sensor 405 may be incorporated into one of the mobile devices 115 described with reference to FIGS. 1 and/or 2.

By way of example, the image sensor 405 is shown to have two illuminated regions 410-a, 410-b, each of which corresponds to a respective light fixture 205. The first illuminated region 410-a includes an image 415-a of an illuminated indicia associated with a first light fixture, and the second illuminated region 410-b includes an image 415-b of an illuminated indicia associated with a second light fixture. Methods and apparatus for decoding and using an image such as that which is shown in FIG. 4 are described with reference to FIGS. 5-11.

Figure 5:
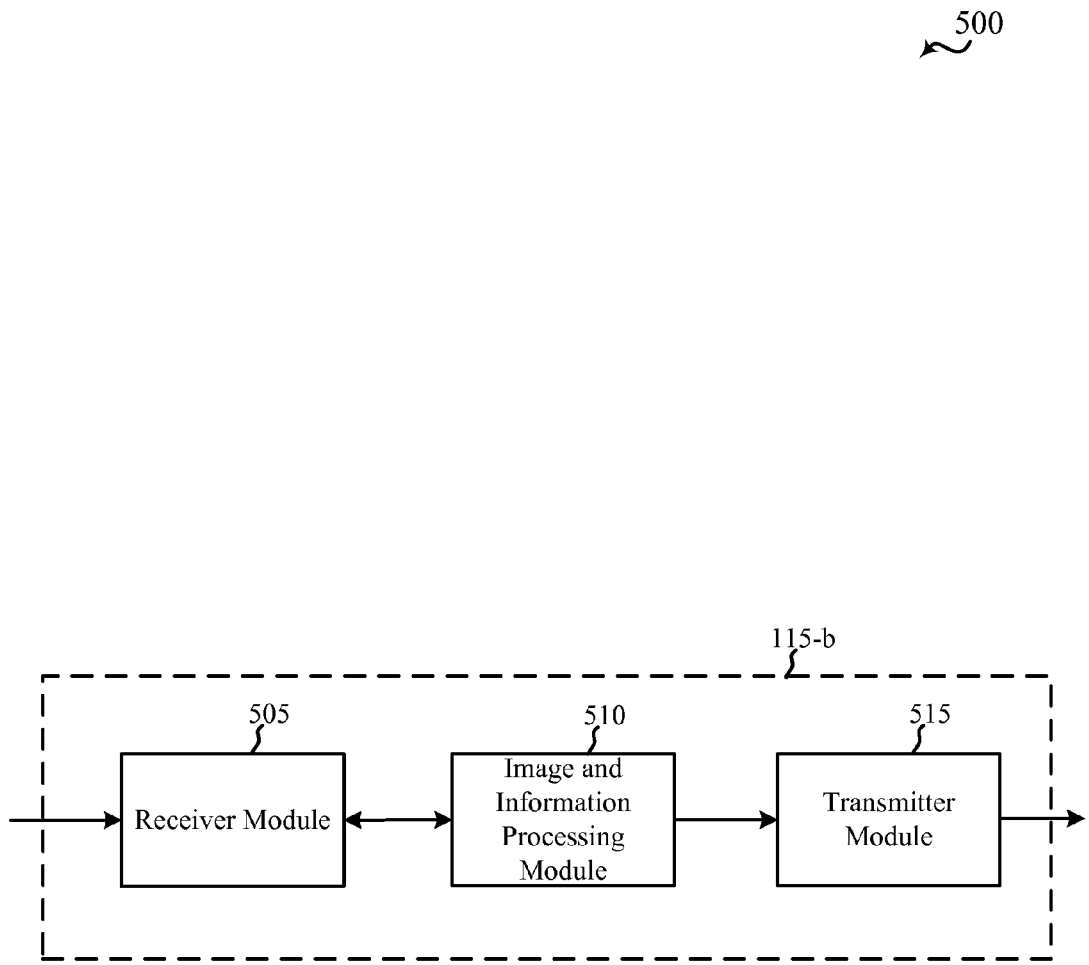
FIGS. 5-8 are block diagrams illustrating mobile devices for receiving information associated with a light fixture, in accordance with various embodiments.

Referring now to FIG. 5, a block diagram 500 illustrates a mobile device 115-b for receiving information associated with a light fixture, in accordance with various embodiments. The mobile device 115-b may be an example of one or more aspects of one of the mobile devices 115 described with reference to FIGS. 1 and/or 2. The mobile device 115-b may also be a processor. The mobile device 115-b may include a receiver module 505, an image and information processing module 510, and/or a transmitter module 515. Each of these components may be in communication with each other.

The components of the mobile device 115-b may, individually or collectively, be implemented with one or more application-specific integrated circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The receiver module 505 may include an image sensor for receiving light from one or more light fixtures 205. The receiver module 505 may also include a radio frequency (RF) receiver such as a cellular receiver and/or a wireless local area network (WLAN) receiver. The cellular receiver may in some cases include an LTE/LTE-A receiver. The cellular receiver may be used to receive various types of data and/or control signals (i.e., transmissions) over one or more communication channels of a wireless communications system, such as the wireless communications system 100 shown in FIG. 1. The WLAN receiver may be used to receive various types of data and/or control signals (i.e., transmissions) over a WLAN.

The image and information processing module 510 may perform various functions. In some embodiments, the image and information processing module 510 may manage operation of the receiver module 505 and/or the transmitter module 515. For example, the image and information processing module 510 may periodically, or upon a trigger, cause the receiver module 505 to capture an image of one or more light fixtures (e.g., an image of one or more light fixtures on a ceiling). The image of the one or more light fixtures may include an image of one or more illuminated indicia, wherein each illuminated indicia is co-located with a corresponding light fixture and placed in, on, or adjacent its corresponding light fixture. The illuminated indicia may include, for example, colored filters and/or light blocking elements placed in, on, or adjacent particular light fixtures. The indicia associated with each light fixture may be unique (or may be repeated at a relatively low frequency within a population of light fixtures). In this manner, the image and information processing module 510 may use an illuminated indicia co-located with a particular light fixture to retrieve a location of the light fixture. Alternately, or additionally, the image and information processing module 510 may use an illuminated indicia co-located with a particular light fixture to retrieve information for viewing or playback via the mobile device 115-*b*. In some cases, the information may include useful and/or interesting information about the site at which the mobile device 115-*b* is located. The information may also include an advertisement.

The transmitter module 515 may include an RF transmitter such as a cellular transmitter and/or a WLAN transmitter. The cellular transmitter may in some cases include an LTE/LTE-A transmitter. The cellular transmitter may be used to transmit various types of data and/or control signals (i.e., transmissions) over one or more communication channels of a wireless communications system, such as the wireless communications system 100 shown in FIG. 1. The WLAN transmitter may be used to transmit various types of data and/or control signals (i.e., transmissions) over a WLAN.

Figure 6:
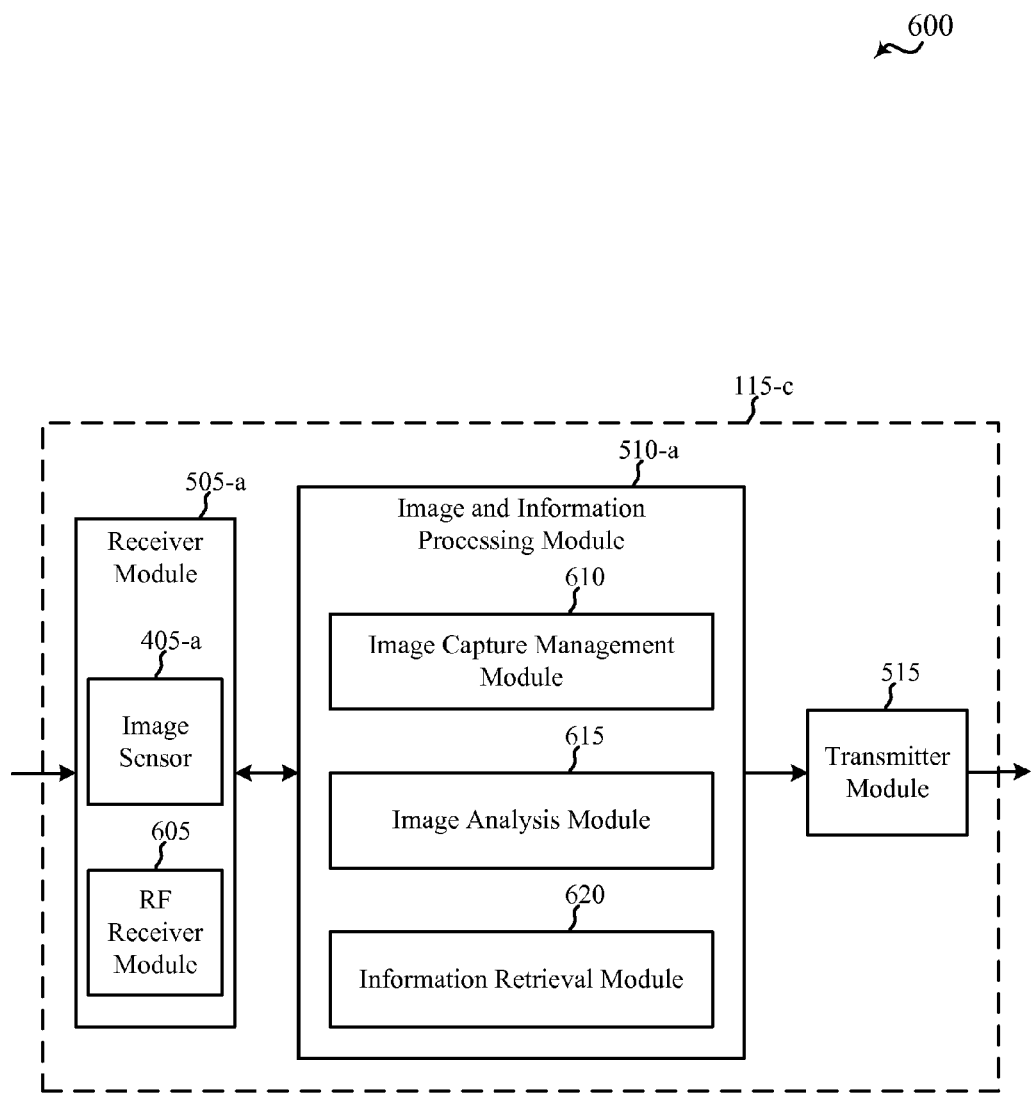

Referring now to FIG. 6, a block diagram 600 illustrates a mobile device 115-*c* for receiving information associated with a light fixture, in accordance with various embodiments. The mobile device 115-*c* may be an example of one or more aspects of one of the mobile devices 115 described with reference to FIGS. 1, 2, and/or 5. The mobile device 115-*c* may also be a processor. The mobile device 115-*c* may include a receiver module 505-*a*, an image and information processing module 510-*a*, and/or a transmitter module 515. Each of these components may be in communication with each other.

The components of the mobile device 115-*c* may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 505-*a* may be an example of one or more aspects of the receiver module 505 described with reference to FIG. 5, and may include an image sensor 405-*a* for receiving light from one or more light fixtures 205. The receiver module 505-*a* may also include an RF receiver module 605 including, for example, a cellular receiver and/or a WLAN receiver. The cellular receiver may in some cases include an LTE/LTE-A receiver. The cellular receiver may be used to receive various types of data and/or control signals (i.e., transmissions) over one or more communication channels of a wireless communications system, such as the wireless communications system 100 shown in FIG. 1. The WLAN receiver may be used to receive various types of data and/or control signals (i.e., transmissions) over a WLAN.

The image and information processing module 510-*a* may be an example of one or more aspects of the image and information processing module 510 described with reference to FIG. 5, and may include an image capture management module 610, an image analysis module 615, and/or an information retrieval module 620. Each of these components may be in communication with each other.

In some embodiments, the image capture management module 610 may be used to operate the image sensor 405-*a* to capture an image of an illuminated indicia. The illuminated indicia may be co-located with a light fixture.

In some embodiments, the image analysis module 615 may be used to determine, from the image of the illuminated indicia, at least one characteristic of the illuminated indicia.

In some embodiments, the at least one characteristic of the illuminated indicia may include at least one color. For example, the image of the illuminated indicia may include at least one color (e.g., at least one characteristic) corresponding to one or more colored filters (e.g., an illuminated indicia) placed in, on, or adjacent the light fixture. In some cases, the entirety of the image of the illuminated indicia may have a particular color. In other cases, the at least one color may include two or more colors defining a pattern, the pattern including regions of different color. In some cases, the image analysis module's order of reading a pattern may be specified a priori, with the order of reading the pattern being specified with reference to a corner or other discernible element of a light fixture.

In some embodiments, the at least one characteristic of the illuminated indicia may include at least one pattern. For example, the image of the illuminated indicia may include at least one pattern (e.g., at least one characteristic) corresponding to at least one arrangement of colored filters (e.g., an illuminated indicia) placed in, on, or adjacent the light fixture. When illuminated, the arrangement of colored filters may produce at least one pattern including regions of different color. Additionally or alternately, the image of the illuminated indicia may include at least one pattern corresponding to at least one arrangement of light blocking elements (e.g., metallic portions, painted portions, opaque portions, semi-opaque portions, etc.) placed in, on, or adjacent the light fixture. When illuminated, the arrangement of light blocking elements may produce at least one pattern including illuminated and non-illuminated regions (and/or more bright and less bright regions). The number and sizes of the light blocking elements may be sufficient to be detectable, but small enough to avoid substantial interference with the useful illumination provided by the light fixture. In some cases, the image analysis module's order of reading a pattern may be specified a priori, with the order of reading the pattern being specified with reference to a corner or other discernible element of a light fixture.

In some embodiments, the at least one characteristic of the illuminated indicia may include at least one shape. For example, the image of the illuminated indicia may include at least one discernible shape (e.g., at least one characteristic) corresponding to at least one shape (e.g., an illuminated indicia) placed in, on, or adjacent the light fixture. A shape may be, for example, a light blocking shape having an illuminated periphery or an illuminated region bounded by a light blocking periphery. The light blocking shape and/or light blocking periphery may be large enough or dark enough to be detectable, but small enough to avoid substantial interference with the useful illumination provided by the light fixture. In some cases, the light blocking shape and/or light blocking periphery may allow some light to pass, but filter or reflect enough light to be detectable among a brighter or less bright field of illumination.

In some embodiments, the at least one characteristic of the illuminated indicia may include a position of at least one colored region within the illuminated indicia. For example, the image of the illuminated indicia may include at least one colored region having a particular position (e.g., one of eight different positions) with respect to a corner of the illuminated indicia.

In some embodiments, the information retrieval module 620 may be used to retrieve information associated with the at least one characteristic of the illuminated indicia.

The retrieved information may in some cases include a location of the light fixture. The location may include, for example, an absolute location (e.g., GPS coordinates) or a location of the light fixture with respect to a map (e.g., a floor map). The retrieved information may also or alternately include at least one of text, audio, and/or video information for viewing or playback via the mobile device 115-c. In some cases, the information may include useful and/or interesting information about the site at which the mobile device 115-c is located. The information may also include an advertisement.

The information may be retrieved by the information retrieval module 620 locally (e.g., from a database or other storage structure stored at the mobile device 115-c) or remotely (e.g., from a database or other storage structure accessed over a wireless communications network).

The transmitter module 515 may be configured similarly to what is described with respect to FIG. 4.

Figure 7:
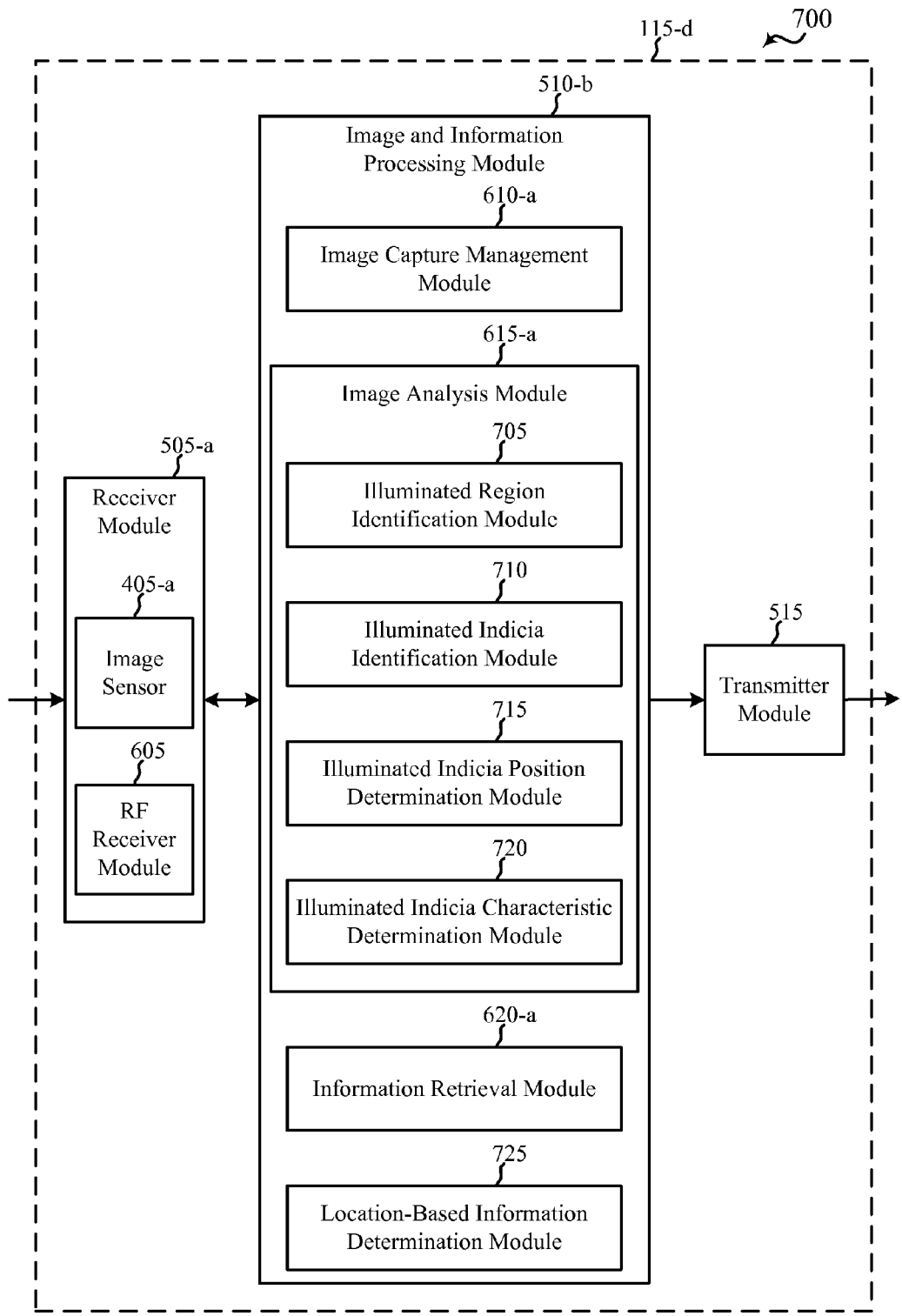

Referring now to FIG. 7, a block diagram 700 illustrates a mobile device 115-d for receiving information associated with a light fixture, in accordance with various embodiments. The mobile device 115-d5, may be an example of one or more aspects of one of the mobile devices 115 described with reference to FIGS. 1, 2, 5, and/or 6. The mobile device 115-d may also be a processor. The mobile device 115-d may include a receiver module 505-a, an image and information processing module 510-b, and/or a transmitter module 515. Each of these components may be in communication with each other.

The components of the mobile device 115-d may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

The receiver module 505-a may be configured similarly to what is described with respect to FIG. 6.

The image and information processing module 510-b may be an example of one or more aspects of the image and information processing module 510 described with reference to FIGS. 5 and/or 6, and may include an image capture management module 610-a, an image analysis module 615-a, an information retrieval module 620, and/or a location-based information determination module 725. Each of these components may be in communication with each other.

In some embodiments, the image capture management module 610-a may be an example of the image capture management module 610 described with reference to FIG. 6 and may be used to operate the image sensor 405-a to capture an image of one or more light fixtures (e.g., one or more light fixtures on a ceiling).

In some embodiments, the image analysis module 615-a may be an example of the image analysis module 615 and may include an illuminated region identification module 705, an illuminated indicia identification module 710, an illuminated indicia position determination module 715, and/or an illuminated indicia characteristic determination module 720. Each of these components may be in communication with each other.

In some embodiments, the illuminated region identification module 705 may be used to identify an illuminated region of an image sensor. The illuminated region may have a brightness exceeding a threshold and may correspond to light emitted by a light fixture. In some embodiments, the light fixture may be one of the light fixtures 205 described with reference to FIGS. 2 and/or 3.

In some embodiments, the illuminated region identification module 705 may identify the illuminated region by segmenting an image captured by the image sensor 405-a to identify all pixels of the image that are sufficiently bright. This may be done, for example, in the Hue-Saturation-Value (HSV) space (or an equivalent space for detecting colors, such as a red, green, and blue (RGB) space or a hue, saturation, and lightness (HSL) space) or after converting the image to grayscale. If the illuminated region is identified in an HSV space, the illuminated region may be identified by identifying a region of pixels having values (i.e., V; brightness values) exceeding a threshold (e.g., above a threshold) and saturations (i.e., S) not exceeding a threshold (e.g., below a threshold). The thresholds may be functions of a currently used exposure setting of the image sensor. Relationships between the thresholds and exposure settings may be tabulated a priori and stored in the mobile device 115-d.

Such a fixed, a prior determined table may be formed because typical brightness of light fixtures in indoor environments can be easy to predict (e.g., light fixtures in indoor environments are often configured to generate 400-1000 lux of illumination under direction exposure conditions).

In some embodiments, the illuminated region identification module 705 may identify at least one corner or other discernible element of the illuminated region. For example, after identifying a region of sufficient brightness, a contour of the region's perimeter may be analyzed using a corner detection algorithm such as the Qualcomm® Fast Computer Vision (FastCV) library.

In some embodiments, the illuminated indicia identification module 710 may be used to identify an image of an illuminated indicia. The image of the illuminated indicia may be at least partly defined by an illuminated region identified by the illuminated region identification module 705. The illuminated indicia may be co-located with a light fixture to which an illuminated region of the image sensor 405-a corresponds. For example, the illuminated indicia may be co-located with one of the light fixtures 205 described with reference to FIGS. 2 and/or 3.

In some embodiments, the illuminated indicia position determination module 715 may be used to determine a position of an image of an illuminated indicia with respect to an illuminated region of the image sensor 405-a.

In embodiments in which the illuminated region identification module 705 identifies at least one corner of an illuminated region of the image sensor 405-a, the illuminated indicia position determination module 715 may determine the position of the image of the illuminated indicia with respect to the illuminated region of the image sensor 405-a by determining the position of the image of the illuminated indicia with respect to the at least one corner of the illuminated region of the image sensor 405-a.

In some embodiments, the illuminated indicia position determination module 715 may determine whether the image of the illuminated indicia occupies one of P possible positions (or slots) with respect to an illuminated region of the image sensor 405-a. The P possible positions may be known to the mobile device 115-d a priori relative to the corners of the illuminated region and, therefore, to the corners of the light fixture to which the illuminated region corresponds. The position occupied by the image of the illuminated indicia may be determined, for example, by sampling the center pixels of each of the P positions and determining whether they have non-white color content (or some predetermined color content). For example, a light fixture may generally provide white illumination, but provide a small amount of non-white illumination corresponding to a number of color filters. The sampled pixel or pixels having non-white color content may indicate that the illuminated indicia occupies a position corresponding to the non-white pixels.

The illuminated indicia characteristic determination module 720 may be used to determine, from an image of an illuminated indicia, at least one characteristic of the illuminated indicia. The at least one characteristic of the illuminated indicia may include at least a position of the image of the illuminated indicia with respect to an illuminated region of the image sensor 405-a (e.g., as determined by the illuminated indicia position determination module 715).

In some embodiments, the at least one characteristic of the illuminated indicia may further include at least one color. For example, the image of the illuminated indicia may include at least one color (e.g., at least one characteristic) corresponding to one or more colored filters (e.g., an illuminated indicia) placed in, on, or adjacent the light fixture. In some cases, the entirety of the image of the illuminated indicia may have a particular color. In other cases, the at least one color may include two or more colors defining a pattern, the pattern including regions of different color. In some cases, the illuminated indicia characteristic determination module's order of reading a pattern may be specified a priori, with the order of reading the pattern being specified with reference to a corner or other discernible element of a light fixture.

In some embodiments, the at least one characteristic of the illuminated indicia may further include at least one pattern. For example, the image of the illuminated indicia may include at least one pattern (e.g., at least one characteristic) corresponding to at least one arrangement of colored filters (e.g., an illuminated indicia) placed in, on, or adjacent the light fixture. When illuminated, the arrangement of colored filters may produce at least one pattern including regions of different color. Additionally or alternatively, the image of the illuminated indicia may include at least one pattern corresponding to at least one arrangement of light blocking elements (e.g., metallic portions, painted portions, opaque portions, semi-opaque portions, etc.) placed in, on, or adjacent the light fixture. When illuminated, the arrangement of light blocking elements may produce at least one pattern including illuminated and non-illuminated regions (and/or more bright and less bright regions). The number and sizes of the light blocking elements may be sufficient to be detectable, but small enough to avoid substantial interference with the useful illumination provided by the light fixture. In some cases, the image analysis module's order of reading a pattern may be specified a priori, with the order of reading the pattern being specified with reference to a corner or other discernible element of a light fixture.

In some embodiments, the at least one characteristic of the illuminated indicia may further include at least one shape. For example, the image of the illuminated indicia may include at least one discernible shape (e.g., at least one characteristic) corresponding to at least one shape (e.g., an illuminated indicia) placed in, on, or adjacent the light fixture. A shape may be, for example, a light blocking shape having an illuminated periphery or an illuminated region bounded by a light blocking periphery. The light blocking shape and/or light blocking periphery may be large enough or dark enough to be detectable, but small enough to avoid substantial interference with the useful illumination provided by the light fixture. In some cases, the light blocking shape and/or light blocking periphery may allow some light to pass, but filter or reflect enough light to be detectable among a brighter or less bright field of illumination.

In some embodiments, the at least one characteristic of the illuminated indicia may further include a position of at least one colored region within the illuminated indicia. For example, the image of the illuminated indicia may include at least one colored region having a particular position (e.g., one of eight different positions) with respect to a corner of the illuminated indicia.

In some embodiments, the information retrieval module 620-a may be used to retrieve information associated with at least one characteristic of an illuminated indicia.

The retrieved information may in some cases include a location of the light fixture. The location may include, for example, an absolute location (e.g., GPS coordinates) or a location of the light fixture with respect to a map (e.g., a floor map). The retrieved information may also or alternatively include at least one of text, audio, and/or video information for viewing or playback via the mobile device 115-c. In some cases, the information may include useful and/or interesting information about the site at which the mobile device 115-c is located. The information may also include an advertisement.

The information may be retrieved by the information retrieval module 620 locally (e.g., from a database or other storage structure stored at the mobile device 115-c) or remotely (e.g., from a database or other storage structure accessed over a wireless communications network).

In some embodiments, the location-based information determination module 725 may use at least the location of a light fixture to determine location-based information for the mobile device 115-d. In some cases, the location-based information may include an identity of a building, building region, and/or room in which the mobile device 115-d is located. The location-based information may also or alternately include an estimated distance between the mobile device 115-d and the light fixture. The location-based information may also include a location of the mobile device 115-d (e.g., a location based on an estimated angle of arrival of the light received from the light fixture and/or the shape of an illuminated region of the image sensor, which illuminated region is attributable to the light fixture (e.g., because the illuminated region contains an image of an illuminated indicia, which illuminated indicia is determined to be associated with the light fixture). Still further, the location-based information may also or alternately include an orientation of the mobile device 115-d with respect to the light fixture. The orientation may in some cases be derived from the shape of an illuminated region of the image sensor, which illuminated region is attributable to the light fixture.

In the case of there being multiple light fixtures that illuminate the image sensor 405-a of the mobile device 115-d, the position of the mobile device 115-d may be determined (e.g., with respect to the earth's magnetic field (e.g., a GPS coordinate system) or a map (e.g., a floor map)).

The transmitter module 515 may be configured similarly to what is described with respect to FIG. 4.

Figure 8:
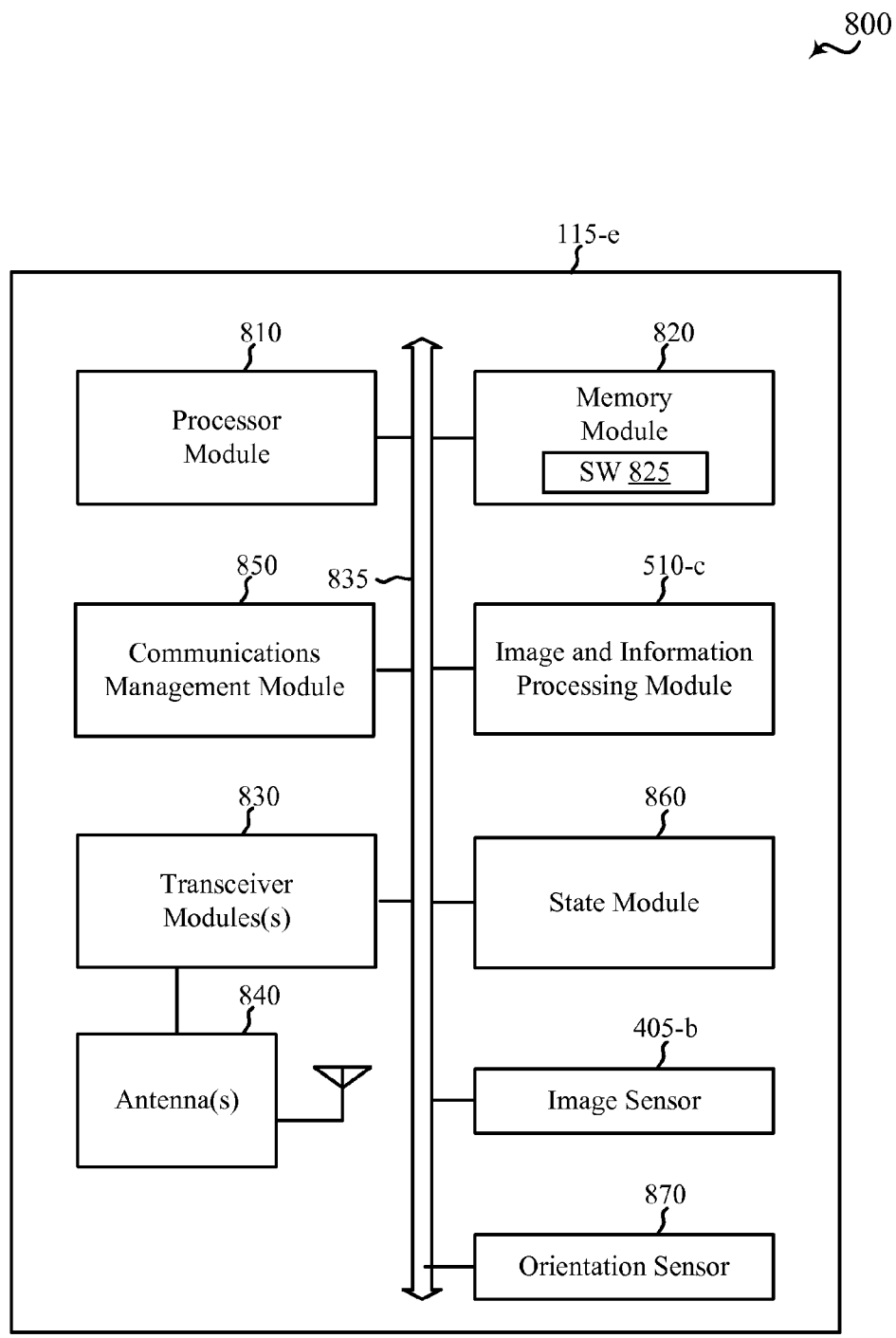

FIG. 8 is a block diagram 800 illustrating an example of a mobile device 115-e, in accordance with various embodiments. The mobile device 115-e may be an example of one or more aspects of the mobile device 115 described with reference to FIGS. 1, 2, 5, 6, and/or 7. The mobile device 115-e may have any of various configurations and may be included or be part of a personal computer (e.g., a laptop computer, netbook computer, tablet computer, etc.), a cellular telephone, a PDA, a digital video recorder (DVR), an internet appliance, a gaming console, an e-reader, etc. The mobile device 115-e may have an internal power supply (not shown), such as a small battery, to facilitate mobile operation.

The mobile device 115-e may include a processor module 810, a memory module 820, at least one transceiver module (represented by transceiver module(s) 830), at least one antenna (represented by antenna(s) 840), an image sensor 405-b, and/or an image and information processing module 510-c. Each of these components may be in communication with each other, directly or indirectly, over one or more buses 835.

The memory module 820 may include random access memory (RAM) and/or read only memory (ROM). The memory module 820 may store computer-readable, computer-executable software (SW) code 825 containing instructions that are configured to, when executed, cause the processor module 810 to perform various functions described herein for receiving information associated with a light fixture. Alternatively, the software code 825 may not be directly executable by the processor module 810 but be configured to cause the mobile device 115-e (e.g., when compiled and executed) to perform various of the functions described herein.

The processor module 810 may include an intelligent hardware device, e.g., a CPU, a microcontroller, an ASIC, etc. The processor module 810 may process information received through the transceiver module(s) 830 and/or image sensor 405-b, as well as information to be sent to the transceiver module(s) 830 for transmission via the antenna(s) 840. The processor module 810 may handle, alone or in connection with the image and information processing module 510-c, various aspects of receiving information associated with a light fixture.

The transceiver module(s) 830 may include a modem configured to modulate packets and provide the modulated packets to the antenna(s) 840 for transmission, and to demodulate packets received from the antenna(s) 840. The transceiver module(s) 830 may in some cases be implemented as one or more transmitter modules and one or more separate receiver modules. The transceiver module(s) 830 may be configured to communicate bi-directionally, via the antenna(s) 840, with one or more eNBs 105 or other devices. While the mobile device 115-e may include a single antenna, there may be embodiments in which the mobile device 115-e may include multiple antennas 840.

The image sensor 405-b may be an example of one or more aspects of the image sensor 405 described with reference to FIGS. 4, 6, and/or 7.

The image and information processing module 510-c may be an example of one or more aspects of the image and information processing module 510 described with reference to FIGS. 5, 6, and/or 7. By way of example, the image and information processing module 510-c may be a component of the mobile device 115-e in communication with some or all of the other components of the mobile device 115-e over one or more buses 835. Alternatively, functionality of the image and information processing module 510-c may be implemented as a computer program product and/or as one or more controller elements of the processor module 810.

According to the architecture of FIG. 8, the mobile device 115-e may further include a communications management module 850, and/or a state module 860. The communications management module 850 may manage communications with other mobile devices 115. By way of example, the communications management module 850 may be a component of the mobile device 115-e in communication with some or all of the other components of the mobile device 115-e via a bus. Alternatively, functionality of the communications management module 850 may be implemented as a component of the transceiver module(s) 830, as a computer program product, and/or as one or more controller elements of the processor module 810. The state module 860 may reflect and control the current device state (e.g., context, authentication, base station association, and/or other connectivity issues).

The mobile device 115-e may also include an orientation sensor 870, such as an accelerometer or gyroscope, to determine an orientation of the mobile device 115-e with respect to a reference (e.g., the earth).

The components of the mobile device 115-e may, individually or collectively, be implemented with one or more ASICs adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors. Each of the noted modules may be a means for performing one or more functions related to operation of the mobile device 115-*e*.

Figure 9:
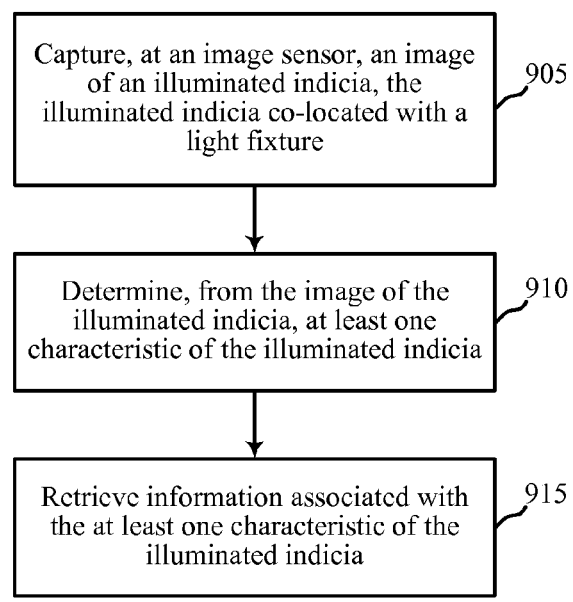
FIGS. 9-11 are flow charts illustrating methods of using a mobile device equipped with an image sensor to retrieve information associated with a light fixture, in accordance with various embodiments.

FIG. 9 is a flow chart illustrating a method 900 of using a mobile device equipped with an image sensor to retrieve information associated with a light fixture. For clarity, the method 900 is described below with reference to one of the mobile devices 115 described with reference to FIGS. 1, 2, 5, 6, 7, and/or 8. In one implementation, the image and information processing module 510 described with reference to FIGS. 5, 6, 7, and/or 8 may execute one or more sets of codes to control the functional elements of a mobile device 115 to perform the functions described below.

At block 905, an image of an illuminated indicia may be captured at an image sensor. The illuminated indicia may be co-located with a light fixture, such as one of the light fixtures 205 described with reference to FIGS. 2 and/or 3. The image sensor at which the image of the illuminated indicia is captured may be an image sensor of a mobile device 115, such as the image sensor 405 described with reference to FIGS. 4, 6, 7, and/or 8. The operation(s) at block 905 may be performed or managed using the image and information processing module 510 described with reference to FIGS. 5, 6, 7, and/or 8, and/or the image capture management module 610 described with reference to FIGS. 6 and/or 7.

At block 910, at least one characteristic of the illuminated indicia may be determined from the image of the illuminated indicia.

In some embodiments, the at least one characteristic of the illuminated indicia may include at least one color. For example, the image of the illuminated indicia may include at least one color (e.g., at least one characteristic) corresponding to one or more colored filters (e.g., an illuminated indicia) placed in, on, or adjacent the light fixture. In some cases, the entirety of the image of the illuminated indicia may have a particular color. In other cases, the at least one color may include two or more colors defining a pattern, the pattern including regions of different color. In some cases, an order of reading a pattern may be specified a priori, with the order of reading the pattern being specified with reference to a corner or other discernible element of a light fixture.

In some embodiments, the at least one characteristic of the illuminated indicia may include at least one pattern. For example, the image of the illuminated indicia may include at least one pattern (e.g., at least one characteristic) corresponding to at least one arrangement of colored filters (e.g., an illuminated indicia) placed in, on, or adjacent the light fixture. When illuminated, the arrangement of colored filters may produce at least one pattern including regions of different color. Additionally or alternately, the image of the illuminated indicia may include at least one pattern corresponding to at least one arrangement of light blocking elements (e.g., metallic portions, painted portions, opaque portions, semi-opaque portions, etc.) placed in, on, or adjacent the light fixture. When illuminated, the arrangement of light blocking elements may produce at least one pattern including illuminated and non-illuminated regions (and/or more bright and less bright regions). The number and sizes of the light blocking elements may be sufficient to be detectable, but small enough to avoid substantial interference with the useful illumination provided by the light fixture. In some cases, an order of reading a pattern may be specified a priori, with the order of reading the pattern being specified with reference to a corner or other discernible element of a light fixture.

In some embodiments, the at least one characteristic of the illuminated indicia may include at least one shape. For example, the image of the illuminated indicia may include at least one discernible shape (e.g., at least one characteristic) corresponding to at least one shape (e.g., an illuminated indicia) placed in, on, or adjacent the light fixture. A shape may be, for example, a light blocking shape having an illuminated periphery or an illuminated region bounded by a light blocking periphery. The light blocking shape and/or light blocking periphery may be large enough or dark enough to be detectable, but small enough to avoid substantial interference with the useful illumination provided by the light fixture. In some cases, the light blocking shape and/or light blocking periphery may allow some light to pass, but filter or reflect enough light to be detectable among a brighter or less bright field of illumination.

In some embodiments, the at least one characteristic of the illuminated indicia may include a position of at least one colored region within the illuminated indicia. For example, the image of the illuminated indicia may include at least one colored region having a particular position (e.g., one of eight different positions) with respect to a corner of the illuminated indicia.

The operation(s) at block 910 may be performed or managed using the image and information processing module 510 described with reference to FIGS. 5, 6, 7, and/or 8, and/or the image analysis module 615 described with reference to FIGS. 6 and/or 7.

At block 915, information associated with the at least one characteristic of the illuminated indicia may be retrieved.

In some embodiments, the retrieved information may include a location of the light fixture. The location may include, for example, an absolute location (e.g., GPS coordinates) or a location of the light fixture with respect to a map (e.g., a floor map).

In other embodiments, the retrieved information may include at least one of text, audio, and/or video information for viewing or playback via a mobile device 115. In some cases, the information may include useful and/or interesting information about the site at which the mobile device 115 is located. The information may also include an advertisement.

The information may be retrieved locally (e.g., from a database or other storage structure stored at the mobile device 115) or remotely (e.g., from a database or other storage structure accessed over a wireless communications network).

The operation(s) at block 915 may be performed or managed using the image and information processing module 510 described with reference to FIGS. 5, 6, 7, and/or 8, and/or the information retrieval module 620 described with reference to FIGS. 6 and/or 7.

Therefore, the method 900 may be used for retrieving information associated with a light fixture. It should be noted that the method 900 is just one implementation and that the operations of the method 900 may be rearranged or otherwise modified such that other implementations are possible.

Figure 10:
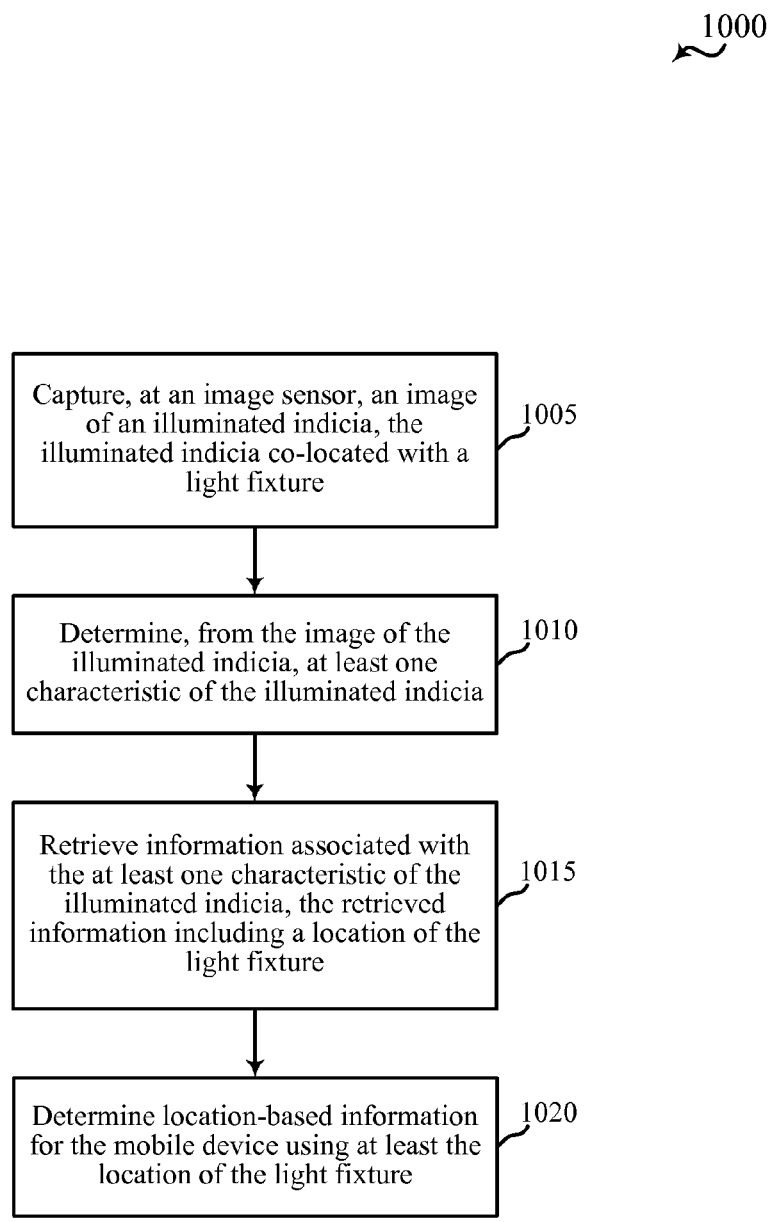

FIG. 10 is a flow chart illustrating a method 1000 of using a mobile device equipped with an image sensor to retrieve information associated with a light fixture. For clarity, the method 1000 is described below with reference to one of the mobile devices 115 described with reference to FIGS. 1, 2, 5, 6, 7, and/or 8. In one implementation, the image and information processing module 510 described with reference to FIGS. 5, 6, 7, and/or 8 may execute one or more sets of codes to control the functional elements of a mobile device 115 to perform the functions described below.

At block 1005, an image of an illuminated indicia may be captured at an image sensor. The illuminated indicia may be co-located with a light fixture, such as one of the light fixtures 205 described with reference to FIGS. 2 and/or 3. The image sensor at which the image of the illuminated indicia is captured may be an image sensor of a mobile device 115, such as the image sensor 405 described with reference to FIGS. 4, 6, 7, and/or 8. The operation(s) at block 1005 may be performed or managed using the image and information processing module 510 described with reference to FIGS. 5, 6, 7, and/or 8, and/or the image capture management module 610 described with reference to FIGS. 6 and/or 7.

At block 1010, at least one characteristic of the illuminated indicia may be determined from the image of the illuminated indicia.

In some embodiments, the at least one characteristic of the illuminated indicia may include at least one color. For example, the image of the illuminated indicia may include at least one color (e.g., at least one characteristic) corresponding to one or more colored filters (e.g., an illuminated indicia) placed in, on, or adjacent the light fixture. In some cases, the entirety of the image of the illuminated indicia may have a particular color. In other cases, the at least one color may include two or more colors defining a pattern, the pattern including regions of different color. In some cases, an order of reading a pattern may be specified a priori, with the order of reading the pattern being specified with reference to a corner or other discernible element of a light fixture.

In some embodiments, the at least one characteristic of the illuminated indicia may include at least one pattern. For example, the image of the illuminated indicia may include at least one pattern (e.g., at least one characteristic) corresponding to at least one arrangement of colored filters (e.g., an illuminated indicia) placed in, on, or adjacent the light fixture. When illuminated, the arrangement of colored filters may produce at least one pattern including regions of different color. Additionally or alternately, the image of the illuminated indicia may include at least one pattern corresponding to at least one arrangement of light blocking elements (e.g., metallic portions, painted portions, opaque portions, semi-opaque portions, etc.) placed in, on, or adjacent the light fixture. When illuminated, the arrangement of light blocking elements may produce at least one pattern including illuminated and non-illuminated regions (and/or more bright and less bright regions). The number and sizes of the light blocking elements may be sufficient to be detectable, but small enough to avoid substantial interference with the useful illumination provided by the light fixture. In some cases, an order of reading a pattern may be specified a priori, with the order of reading the pattern being specified with reference to a corner or other discernible element of a light fixture.

In some embodiments, the at least one characteristic of the illuminated indicia may include at least one shape. For example, the image of the illuminated indicia may include at least one discernible shape (e.g., at least one characteristic) corresponding to at least one shape (e.g., an illuminated indicia) placed in, on, or adjacent the light fixture. A shape may be, for example, a light blocking shape having an illuminated periphery or an illuminated region bounded by a light blocking periphery. The light blocking shape and/or light blocking periphery may be large enough or dark enough to be detectable, but small enough to avoid substantial interference with the useful illumination provided by the light fixture. In some cases, the light blocking shape and/or light blocking periphery may allow some light to pass, but filter or reflect enough light to be detectable among a brighter or less bright field of illumination.

In some embodiments, the at least one characteristic of the illuminated indicia may include a position of at least one colored region within the illuminated indicia. For example, the image of the illuminated indicia may include at least one colored region having a particular position (e.g., one of eight different positions) with respect to a corner of the illuminated indicia.

The operation(s) at block 1010 may be performed or managed using the image and information processing module 510 described with reference to FIGS. 5, 6, 7, and/or 8, and/or the image analysis module 615 described with reference to FIGS. 6 and/or 7.

At block 1015, information associated with the at least one characteristic of the illuminated indicia may be retrieved. In some embodiments, the retrieved information may include a location of the light fixture. The location may include, for example, an absolute location (e.g., GPS coordinates) or a location of the light fixture with respect to a map (e.g., a floor map).

The information may be retrieved locally (e.g., from a database or other storage structure stored at the mobile device 115) or remotely (e.g., from a database or other storage structure accessed over a wireless communications network).

The operation(s) at block 1015 may be performed or managed using the image and information processing module 510 described with reference to FIGS. 5, 6, 7, and/or 8, and/or the information retrieval module 620 described with reference to FIGS. 6 and/or 7.

At block 1020, location-based information for a mobile device 115 performing the method 1000 may be determined using at least the location of the light fixture. In some cases, the location-based information may include an identity of a building, building region, and/or room in which the mobile device 115 is located. The location-based information may also or alternately include an estimated distance between the mobile device 115 and the light fixture. The location-based information may also include a location of the mobile device 115 (e.g., a location based on an estimated angle of arrival of the light received from the light fixture and/or the shape of an illuminated region of the image sensor, which illuminated region is attributable to the light fixture (e.g., because the illuminated region contains an image of an illuminated indicia, which illuminated indicia is determined to be associated with the light fixture). Still further, the location-based information may also or alternately include an orientation of the mobile device 115 with respect to the light fixture. The orientation may in some cases be derived from the shape of an illuminated region of the image sensor, which illuminated region is attributable to the light fixture.

In the case of there being multiple light fixtures that illuminate an image sensor of a mobile device 115, the position of the mobile device 115 may be determined (e.g., with respect to the earth's magnetic field (e.g., a GPS coordinate system) or a map (e.g., a floor map)).

The operation(s) at block 1020 may be performed or managed using the image and information processing module 510 described with reference to FIGS. 5, 6, 7, and/or 8, and/or the location-based information determination module 630 described with reference to FIG. 7.

Therefore, the method 1000 may be used for retrieving information associated with a light fixture. It should be noted that the method 1000 is just one implementation and that the operations of the method 1000 may be rearranged or otherwise modified such that other implementations are possible.

Figure 11:
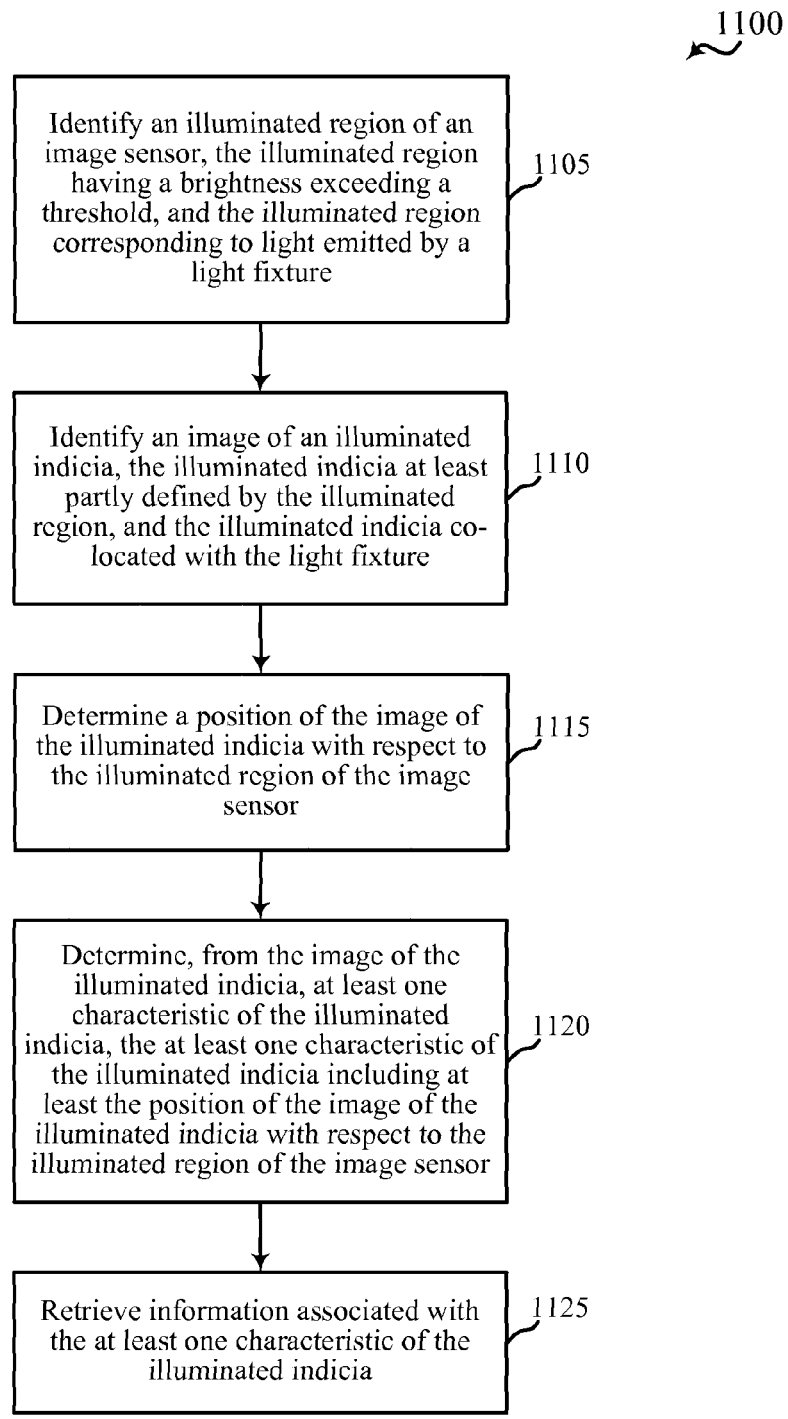

FIG. 11 is a flow chart illustrating a method 1100 of using a mobile device equipped with an image sensor to retrieve information associated with a light fixture. For clarity, the method 1100 is described below with reference to one of the mobile devices 115 described with reference to FIGS. 1, 2, 5, 6, 7, and/or 8. In one implementation, the image and information processing module 510 described with reference to FIGS. 5, 6, 7, and/or 8 may execute one or more sets of codes to control the functional elements of a mobile device 115 to perform the functions described below.

At block 1105, an illuminated region of an image sensor may be identified. The illuminated region may have a brightness exceeding a threshold and may correspond to light emitted by a light fixture. In some embodiments, the light fixture may be one of the light fixtures 205 described with reference to FIGS. 2 and/or 3. The image sensor for which the illuminated region is identified may be an image sensor of a mobile device 115, such as the image sensor 405 described with reference to FIGS. 4, 6, 7, and/or 8. The operation(s) at block 1105 may be performed or managed using the image and information processing module 510 described with reference to FIGS. 5, 6, 7, and/or 8, the image capture management module 610 and/or image analysis module 615 described with reference to FIGS. 6 and/or 7, and/or the illuminated region identification module 705 described with reference to FIG. 7.

In some embodiments, identifying the illuminated region may include capturing an image from an image sensor and segmenting the captured image to identify all pixels of the image that are sufficiently bright. This may be done, for example, in the HSV) space (or an equivalent space for detecting colors, such as an RGB space or an HSL space) or after converting the image to grayscale. If the illuminated region is identified in an HSV space, the illuminated region may be identified by identifying a region of pixels having values (i.e., V; brightness values) exceeding a threshold (e.g., above a threshold) and saturations (i.e., S) not exceeding a threshold (e.g., below a threshold). The thresholds may be functions of a currently used exposure setting of the image sensor. Relationships between the thresholds and exposure settings may be tabulated a priori and stored in a mobile device 115 capable of performing the method 1100. Such a fixed, a prior determined table may be formed because typical brightness of light fixtures in indoor environments can be easy to predict (e.g., light fixtures in indoor environments are often configured to generate 400-1000 lux of illumination under direction exposure conditions).

In some embodiments, identifying the illuminated region may include identifying at least one corner or other discernible element of the illuminated region. For example, after identifying a region of sufficient brightness, a contour of the region's perimeter may be analyzed using a corner detection algorithm such as the FastCV library.

At block 1110, an image of an illuminated indicia may be identified. The image of the illuminated indicia may be at least partly defined by the illuminated region identified at block 1105. The illuminated indicia may be co-located with the light fixture to which the illuminated region corresponds. For example, the illuminated indicia may be co-located with one of the light fixtures 205 described with reference to FIGS. 2 and/or 3. The operation(s) at block 1110 may be performed or managed using the image and information processing module 510 described with reference to FIGS. 5, 6, 7, and/or 8, the image capture management module 610 and/or image analysis module 615 described with reference to FIGS. 6 and/or 7, and/or the illuminated indicia identification module 710 described with reference to FIG. 7.

At block 1115, a position of the image of the illuminated indicia with respect to the illuminated region of the image sensor may be determined. The operation(s) at block 1115 may be performed or managed using the image and information processing module 510 described with reference to FIGS. 5, 6, 7, and/or 8, the image analysis module 615 described with reference to FIGS. 6 and/or 7, and/or the illuminated indicia position determination module 715 described with reference to FIG. 7.

In embodiments in which at least one corner of the illuminated region of the image sensor is identified at block 1105, determining the position of the image of the illuminated indicia with respect to the illuminated region of the image sensor may include determining the position of the image of the illuminated indicia with respect to the at least one corner of the illuminated region of the image sensor.

In some embodiments, it may be determined that the image of the illuminated indicia occupies one of P possible positions (or slots) with respect to the illuminated region of the image sensor, which P possible positions are known a priori relative to the corners of the illuminated region and, therefore, to the corners of the light fixture to which the illuminated region corresponds. The position occupied by the image of the illuminated indicia may be determined, for example, by sampling the center pixels of each of the P positions and determining whether they have non-white color content (or some predetermined color content). For example, a light fixture may generally provide white illumination, but provide a small amount of non-white illumination corresponding to a number of color filters. The sampled pixel or pixels having non-white color content may indicate that the illuminated indicia occupies a position corresponding to the non-white pixels.

At block 1120, at least one characteristic of the illuminated indicia may be determined from the image of the illuminated indicia. The at least one characteristic of the illuminated indicia may include at least the position of the image of the illuminated indicia with respect to the illuminated region of the image sensor.

In some embodiments, the at least one characteristic of the illuminated indicia may further include at least one color. For example, the image of the illuminated indicia may include at least one color (e.g., at least one characteristic) corresponding to one or more colored filters (e.g., an illuminated indicia) placed in, on, or adjacent the light fixture. In some cases, the entirety of the image of the illuminated indicia may have a particular color. In other cases, the at least one color may include two or more colors defining a pattern, the pattern including regions of different color. In some cases, an order of reading a pattern may be specified a priori, with the order of reading the pattern being specified with reference to a corner or other discernible element of a light fixture.

In some embodiments, the at least one characteristic of the illuminated indicia may further include at least one pattern. For example, the image of the illuminated indicia may include at least one pattern (e.g., at least one characteristic) corresponding to at least one arrangement of colored filters (e.g., an illuminated indicia) placed in, on, or adjacent the light fixture. When illuminated, the arrangement of colored filters may produce at least one pattern including regions of different color. Additionally or alternatively, the image of the illuminated indicia may include at least one pattern corresponding to at least one arrangement of light blocking elements (e.g., metallic portions, painted portions, opaque portions, semi-opaque portions, etc.) placed in, on, or adjacent the light fixture. When illuminated, the arrangement of light blocking elements may produce at least one pattern including illuminated and non-illuminated regions (and/or more bright and less bright regions). The number and sizes of the light blocking elements may be sufficient to be detectable, but small enough to avoid substantial interference with the useful illumination provided by the light fixture. In some cases, an order of reading a pattern may be specified a priori, with the order of reading the pattern being specified with reference to a corner or other discernible element of a light fixture.

In some embodiments, the at least one characteristic of the illuminated indicia may further include at least one shape. For example, the image of the illuminated indicia may include at least one discernible shape (e.g., at least one characteristic) corresponding to at least one shape (e.g., an illuminated indicia) placed in, on, or adjacent the light fixture. A shape may be, for example, a light blocking shape having an illuminated periphery or an illuminated region bounded by a light blocking periphery. The light blocking shape and/or light blocking periphery may be large enough or dark enough to be detectable, but small enough to avoid substantial interference with the useful illumination provided by the light fixture. In some cases, the light blocking shape and/or light blocking periphery may allow some light to pass, but filter or reflect enough light to be detectable among a brighter or less bright field of illumination.

In some embodiments, the at least one characteristic of the illuminated indicia may further include a position of at least one colored region within the illuminated indicia. For example, the image of the illuminated indicia may include at least one colored region having a particular position (e.g., one of eight different positions) with respect to a corner of the illuminated indicia.

The operation(s) at block 1120 may be performed or managed using the image and information processing module 510 described with reference to FIGS. 5, 6, 7, and/or 8, the image analysis module 615 described with reference to FIGS. 6 and/or 7, and/or the illuminated indicia characteristic determination module 720 described with reference to FIG. 7.

At block 1125, information associated with the at least one characteristic of the illuminated indicia may be retrieved.

In some embodiments, the retrieved information may include a location of the light fixture. The location may include, for example, an absolute location (e.g., GPS coordinates) or a location of the light fixture with respect to a map (e.g., a floor map).

In other embodiments, the retrieved information may include at least one of text, audio, and/or video information for viewing or playback via a mobile device 115. In some cases, the information may include useful and/or interesting information about the site at which the mobile device 115 is located. The information may also include an advertisement.

The information may be retrieved locally (e.g., from a database or other storage structure stored at the mobile device 115) or remotely (e.g., from a database or other storage structure accessed over a wireless communications network).

The operation(s) at block 1125 may be performed or managed using the image and information processing module 510 described with reference to FIGS. 5, 6, 7, and/or 8, and/or the information retrieval module 620 described with reference to FIGS. 6 and/or 7.

Therefore, the method 1100 may be used for retrieving information associated with a light fixture. It should be noted that the method 1100 is just one implementation and that the operations of the method 1100 may be rearranged or otherwise modified such that other implementations are possible.

In some cases, one or more aspects of the methods 900, 1000, and/or 1100 may be combined.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description below, although the techniques are applicable beyond LTE applications.

The communication networks that may accommodate some of the various disclosed embodiments may be packet-based networks that operate according to a layered protocol stack. For example, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARM) to provide retransmission at the MAC layer to improve link efficiency. At the Physical layer, the transport channels may be mapped to Physical channels.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration. A processor may in some cases be in electronic communication with a memory, where the memory stores instructions that are executable by the processor.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

A computer program product or computer-readable medium both include a computer-readable storage medium and communication medium, including any mediums that facilitates transfer of a computer program from one place to another. A storage medium may be any medium that can be accessed by a general purpose or special purpose computer. By way of example, and not limitation, computer-readable medium can comprise RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote light source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of using a mobile device equipped with an image sensor to retrieve information associated with a light fixture, comprising:
    capturing, at the image sensor of the mobile device, an image of an illuminated indicia, the illuminated indicia co-located with the light fixture and having at least one characteristic of a set of possible characteristics assigned to the light fixture for distinguishing the light fixture from other light fixtures;
    identifying at least one corner of an illuminated region at least partly defining the image of the illuminated indicia;
    determining, from the mobile device processing the image of the illuminated indicia, the at least one characteristic that comprises a position of the image of the illuminated indicia with respect to the at least one corner of the illuminated region; and
    retrieving information associated with the at least one characteristic of the illuminated indicia.

2. The method of claim 1, wherein the retrieved information comprises a location of the light fixture.

3. The method of claim 2, wherein the location of the light fixture is the location of the light fixture with respect to a floor map.

4. The method of claim 2, further comprising:
    determining location-based information for the mobile device using at least the location of the light fixture.

5. The method of claim 1, wherein the at least one characteristic of the illuminated indicia comprises at least one color.

6. The method of claim 1, wherein the at least one characteristic of the illuminated indicia comprises a position of at least one colored region within the illuminated indicia.

7. The method of claim 1, wherein the at least one characteristic of the illuminated indicia comprises at least one pattern.

8. The method of claim 7, wherein the at least one pattern is a pattern including an arrangement of colored filters and light blocking elements.

9. The method of claim 1, wherein the at least one characteristic of the illuminated indicia comprises at least one shape.

10. The method of claim 1, further comprising:
identifying the illuminated region of the image sensor as having a brightness exceeding a threshold.

11. The method of claim 10, wherein identifying the illuminated region of the image sensor comprises identifying a set of pixels having a brightness exceeding the threshold.

12. The method of claim 10, wherein the at least one characteristic of the illuminated indicia further comprises a pattern including regions of different color.

13. The method of claim 1, wherein the retrieved information comprises at least one of text, audio, or video information for viewing or playback via the mobile device.

14. A mobile device equipped with an image sensor to retrieve information associated with a light fixture, comprising:
means for capturing, at the image sensor of the mobile device, an image of an illuminated indicia, the illuminated indicia co-located with the light fixture and having at least one characteristic of a set of possible characteristics assigned to the light fixture for distinguishing the light fixture from other light fixtures;
means for identifying at least one corner of an illuminated region at least partly defining the image of the illuminated indicia;
means for determining, from processing the image of the illuminated indicia, the at least one characteristic that comprises a position of the image of the illuminated indicia with respect to the at least one corner of the illuminated region; and
means for retrieving information associated with the at least one characteristic of the illuminated indicia.

15. The mobile device of claim 14, wherein the retrieved information comprises a location of the light fixture.

16. The mobile device of claim 15, wherein the location of the light fixture is the location of the light fixture with respect to a floor map.

17. The mobile device of claim 15, further comprising:
means for determining location-based information for the mobile device using at least the location of the light fixture.

18. The mobile device of claim 14, wherein the at least one characteristic of the illuminated indicia comprises at least one color.

19. The mobile device of claim 14, wherein the at least one characteristic of the illuminated indicia comprises a position of at least one colored region within the illuminated indicia.

20. The mobile device of claim 14, wherein the at least one characteristic of the illuminated indicia comprises at least one pattern.

21. The mobile device of claim 20, wherein the at least one pattern is a pattern including regions of different color.

22. The mobile device of claim 14, wherein the at least one characteristic of the illuminated indicia comprises at least one shape.

23. The mobile device of claim 14, further comprising:
means for identifying the illuminated region of the image sensor as having a brightness exceeding a threshold.

24. The mobile device of claim 23, wherein the means for identifying the illuminated region of the image sensor comprises means for identifying a set of pixels having a brightness exceeding the threshold.

25. The mobile device of claim 23, wherein the at least one characteristic of the illuminated indicia further comprises a pattern including regions of different color.

26. The mobile device of claim 14, wherein the retrieved information comprises at least one of text, audio, or video information for viewing or playback via the mobile device.

27. A mobile device equipped with an image sensor to retrieve information associated with a light fixture, comprising:
a processor;
memory in electronic communication with the processor; and
instructions stored in the memory, the instructions being executable by the processor to:
capture, at the image sensor, an image of an illuminated indicia, the illuminated indicia co-located with the light fixture and having at least one characteristic of a set of possible characteristics assigned to the light fixture for distinguishing the light fixture from other light fixtures;
identify at least one corner of an illuminated region at least partly defining the image of the illuminated indicia;
determine, from processing the image of the illuminated indicia, the at least one characteristic that comprises a position of the image of the illuminated indicia with respect to the at least one corner of the illuminated region; and
retrieve information associated with the at least one characteristic of the illuminated indicia.

28. A computer program product for retrieving information associated with a light fixture, the computer program product comprising a non-transitory computer-readable medium storing instructions executable by a processor to:
capture, at an image sensor, an image of an illuminated indicia, the illuminated indicia co-located with the light fixture and having at least one characteristic of a set of possible characteristics assigned to the light fixture for distinguishing the light fixture from other light fixtures;
identify at least one corner of an illuminated region at least partly defining the image of the illuminated indicia;
determine, from processing the image of the illuminated indicia, the at least one characteristic that comprises a position of the image of the illuminated indicia with respect to the at least one corner of the illuminated region; and
retrieve information associated with the at least one characteristic of the illuminated indicia.

* * * * *